United States Patent Office

2,927,090
Patented Mar. 1, 1960

2,927,090

TRIAZINE-FORMALDEHYDE CONDENSATION PRODUCTS

Armin Hiestand, Basel, and Otto Albrecht, Neuewelt, near Basel, Switzerland, assignors to Ciba Limited, Basel, Switzerland, a Swiss firm No Drawing. Application June 1, 1953
Serial No. 358,966

Claims priority, application Switzerland June 4, 1952

6 Claims. (Cl. 260—21)

This invention is based on the observation that valuable new hardenable derivatives of formaldehyde condensation products of amino-1:3:5-triazines containing at least two $NH_2$-groups, which derivatives contain radicals of high molecular weight, can be made by reacting (a) A formaldehyde condensation product of an amino-1:3:5-triazine containing at least two $NH_2$-groups, in which condensation product at least one hydroxymethyl group for every $NH_2$-group of the aminotriazine is etherified with an alcohol containing at most 4 carbon atoms, and which may also contain bound to at least one $NH_2$-group a hydroxymethyl group containing a radical of high molecular weight, especially a hydroxymethyl group esterified with a non-aromatic carboxylic acid of high molecular weight or etherified with an alcohol of high molecular weight, with (b) A partial ester of a polyhydric aliphatic alcohol with a non-aromatic saturated carboxylic acid containing at least 12 carbon atoms or a partial ether of a polyhydric aliphatic alcohol with a monohydric aliphatic alcohol containing at least 12 carbon atoms, or, when the starting material defined under (a) contains at least once the atomic grouping

or R—O— (in which R represents a hydrocarbon radical of high molecular weight, which may contain substituents), an amide or N-methylol-amide of a non-aromatic carboxylic acid containing at least 12 carbon atoms, with the aid of heat under practically anhydrous conditions, if desired, in the presence of a catalyst of acid character, accompanied by the splitting off of the alcohol containing at most 4 carbon atoms, and freeing the reaction mixture from the catalyst if a catalyst has been used.

The formaldehyde condensation products which contain at least one hydroxymethyl group etherified with an alcohol of low molecular weight containing at most 4 carbon atoms, and which constitute the reaction components (a) serving as starting materials in the present process, may in principle be derived from any amino-1:3:5-triazine, provided that it contains at least two $NH_2$-groups and that it can be converted into the corresponding methylol-compounds with formaldehyde and then etherified. However, for reasons of economy it is recommended to use the more easily accessible products, especially melamine, and also N-phenylmelamine, benzoguanamine, acetoguanamine, formoguanamine, ammeline, 2:4-diamino-6-chloro-1:3:5-triazine or the like. The methylol-ethers can be made by methods in themselves known by the action of an appropriate quantity of formaldehyde on an aminotriazine which contains at least two $NH_2$-groups, and the simultaneous or subsequent etherification of the resulting methylol-aminotriazine or mixture of methylol-aminotriazines with an alcohol, such as ethyl alcohol, propyl alcohol, butyl alcohol or advantageously methyl alcohol. In this manner there are often obtained mixtures which are suitable for the present process in so far as they contain at least one etherified hydroxymethyl group for every amino group of the quantity of aminotriazine used. There may be mentioned, for example, the methyl ethers of methylol-melamines containing 4–6 methylol groups, in which 2–6 methylol groups are etherified. Such ethers can be obtained, in known manner, for example, by heating the methylol-melamine with methanol in the presence of a small quantity of a mineral acid.

Derivatives of the aforesaid methylol-amino-triazine ethers, which contain radicals of high molecular weight bound to at least one $NH_2$-group of the triazine ring, and which may also be used as reaction components (a), can be prepared in known manner by the action of reactive compounds, which contain a radical of high molecular weight, on the methylol ethers. For preparing such starting materials there may also be used methylol-aminotriazine ethers in which all the methylol groups are etherified with alcohols of low molecular weight, or those which still contain free methylol groups. Among the reactive compounds, which contain a radical of high molecular weight and serve for preparing the starting materials, there come into consideration principally aliphatic compounds which contain a carbon chain of at least 7 carbon atoms and at least one reactive hydrogen atom bound to an oxygen or sulfur atom or a non-basic nitrogen atom. Compounds containing a non-basic nitrogen atom are amide-like or urethane-like products. There may be mentioned, for example, amides obtained from ammonia or from primary amines, such as methylamine, ethylamine, dodecylamine, octadecylamine or cyclohexamine, on the one hand, and from carboxylic acids, such as acetic acid, chloracetic acid, butyric acid, capric acid, lauric acid, stearic acid, behenic acid or oleic acid, on the other; also substituted ureas, such as monododecyl-urea; urethanes such, for example, as are obtainable from chloroformic acid esters of alcohols of high molecular weight with ammonia or primary amines, such as octadecyl-urethane; and furthermore secondary amides, such as dilauric acid amide or N:N'-diacylated alkylene or arylene diamines, for example, methylene-distearic acid amide.

As compounds which contain a reactive hydrogen atom bound to a sulfur atom there may be mentioned mercaptans, such as dodecyl or octadecyl mercaptan, and also esters of alcohols of high molecular weight with mercapto-carboxylic acids, such as esters of thioglycollic acid.

As compounds which contain a reactive hydrogen atom bound to an oxygen atom there come into consideration carboxylic acids, alcohols and N-methylol-compounds. Among the carboxylic acids, which contain a carbon chain of at least 7 carbon atoms, there may be mentioned capric acid, lauric acid, stearic acid, behenic acid, oleic acid, ricinoleic acid and montanic acid. As alcohols there may be used primary, secondary or tertiary alcohols which may be straight-chained or branch-chained such, for example, as laurin alcohol, cetyl alcohol, octadecyl alcohol or 2-butyl-octanol. There also come into consideration condensation products of polyglycols or alkylene oxides, advantageously ethylene oxide, with alcohols, amines, amides or carboxylic acids, such as the addition product of 1 mol of ethylene oxide with 1 mol of octadecyl alcohol or 1 mol of octadecylamine.

The N-methylol-compounds are advantageously N-methylol-compounds of amides or amide-like compounds such as are mentioned above, for example, methylol-urethanes.

As the aforesaid compounds which may be used as reaction components for preparing the starting materials, there are advantageously used those which contain at least one carbon chain of 18 carbon atoms, especially derivatives of stearic acid, of octadecyl alcohol or of octadecylamine. A suitable starting material is, for example, the condensation product obtainable from 1 mol of a highly methylated methylol-melamine and 1–2 mols of stearic acid.

As stated above, there are used in the present process as reaction components (b) amides or N-methylol-amides of non-aromatic carboxylic acids containing at least 12 carbon atoms, or partial esters of polyhydric aliphatic alcohols with saturated non-aromatic carboxylic acids containing at least 12 carbon atoms, or partial ethers of polyhydric aliphatic alcohols with monohydric aliphatic alcohols containing at least 12 carbon atoms. Compounds of this kind are also known or can easily be made by methods in themselves known. The amides and N-methylol-amides are advantageously derived from aliphatic carboxylic acids, for example, from lauric acid, palmitic acid, stearic acid, oleic acid, behenic acid, linoleic acid, myricylic acid or fatty acids obtained by the oxidation of paraffin wax. Very active end products are obtained by starting from urethanes or their methylol-compounds, for example, N-methylol-octadecyl-urethane.

The advantageous partial esters or partial ethers are, on the one hand, derivatives of glycols, polyglycols, glycerine or glycerine-like compounds and, on the other, of non-aromatic saturated carboxylic acids or monohydric aliphatic alcohols containing at least 12 carbon atoms. Among the polyhydric alcohols to be used for preparing such compounds there may be mentioned, for example, ethylene glycol, 1:3-propylene glycol, 1:3- or 1:4-butylene glycol or higher glycols, and also polyglycols such as diethylene glycol, triethylene glycol, or higher polyglycols obtainable by the condensation of ethylene oxide, and furthermore compounds which contain more than two hydroxyl groups, such as glycerine, erythritols, pentitols and hexitols. Finally, there may be used derivatives of polyhydric alcohols which are capable of forming by reaction with a saturated carboxylic acid or a derivative thereof or with a monohydric aliphatic alcohol containing at least 12 carbon atoms a partial ester or partial ether, respectively, of a polyhydric alcohol. As such compounds there may be mentioned, for example, glycide, and especially halogenhydrins such as ethylene chlorhydrin, ethylene bromhydrin, glycerine chlorhydrins or epichlorhydrin. Such halogen-containing compounds may be converted, for example, by reaction with an alkali salt of a carboxylic acid or an alkali alcoholate of a monohydric aliphatic alcohol containing at least 12 carbon atoms, into a partial ester or partial ether, respectively, suitable for the present process.

As carboxylic acids, which may be used themselves or in the form of reactive derivatives for preparing the partial esters (reaction components (b)), there come into consideration those mentioned above in connection with the amides, provided they have a saturated hydrocarbon chain. Among the monohydric aliphatic alcohols, from which the partial ethers (also reaction components (b)) are derived, there may be mentioned, for example, myricyl alcohol, ceryl alcohol, stearyl alcohol, cetyl alcohol, lauryl alcohol, oleyl alcohol, linoleyl alcohol and linolenyl alcohol. There are also very suitable alcohols or mixtures of alcohols obtainable by the reduction of fatty acids obtained by the oxidation of paraffin wax, and also the higher alcohols or mixtures thereof obtainable by total synthesis from carbon monoxide and hydrogen. There are also suitable mixtures of saturated alcohols such as are obtainable, for example, from drying or semi-drying or non-drying oils by reduction with sodium and alcohol or by other methods, followed by hydrogenation of the multiple bonds, such as from linseed oil, soya bean oil, hemp oil, poppy seed oil, wood oil, dehydrated castor oil, cotton seed oil, coconut oil, cod liver oil, whale oil, menhaden oil, sperm oil and the like. There may also be used the alcohols obtainable from tall oil.

Instead of the free alcohols, there may be used with advantage for preparing the partial ethers their alkali alcoholates or the halogen-compounds corresponding to the alcohols, i.e. alkyl halides.

When the partial esters or partial ethers used in the present process are derived from polyhydric alcohols which contain more than two hydroxyl groups in the molecule, one or more of the hydroxyl groups may be esterfied or etherified. However, it is essential that at least one hydroxyl group should remain free. Especially suitable compounds for use as reaction components (b) are the partial ester of 2 mols of stearic acid with 1 mol of glycerine and the partial ether of 2 mols of stearyl alcohol with 1 mol of glycerine.

As catalysts of acid character, which may, if desired, be used for the reaction, there are suitable inorganic or organic acids, or substances which yield an acid during the reaction or act in a manner analogous to acids, for example, acid anhydrides or Friedel-Crafts catalysts. The choice of the catalyst is preferably left to practical considerations, such as its capacity for being subsequently removed, its cost and its influence on the final product. In order to carry out the reaction under practically anhydrous conditions it has been found advantageous to use a catalyst which is as free from water as possible. Advantageous catalysts are, for example, concentrated hydrochloric acid, sulfuric acid, phosphoric acid, hypophosphorous acid, phthalic acid or phthalic anhydride, maleic anhydride, acetic acid, chloracetic acid, formic acid and the like. The catalysts are in general hardening agents for the lower alkoxymethyl-aminotriazines used as reaction components (a) and also for the final products. It is therefore of advantage not to use too large a proportion of the catalyst. Generally a few parts per mil to a few parts percent calculated on the total reaction mixture is sufficient. In order to obtain stable neutral to weakly basic final products it is of advantage to use catalysts which can be removed from the reaction mixture after the reaction, that is to say, before the reaction mixture is further worked up, in a simple manner such as by distillation, neutralization followed, if desired, by filtration to remove the precipitated salts, or washing with water or a solvent. This applies more especially to the use as catalysts of strong acids, which must be neutralized very cautiously. These methods of removing the catalysts should have no disadvantageous influence on the final products.

The reaction of components (a) with components (b) is carried out at a raised temperature, advantageously at a temperature above 100° C., for example, within the range of 120–200° C. The reactants may simply be melted or they may be reacted in the presence of an inert organic solvent. It may be of advantage to carry out the reaction under reduced pressure, whereby the volatile products formed, that is to say the alcohols of low molecular weight, can be removed from the reaction mixture.

The relative molecular proportions of the components used depends mainly on the number of methylol-ether groups present in component (a). Advantageously one mol of component (a) is reacted with 1–2 mols of component (b). In order that the condensation products obtained by the process shall be hardenable it is necessary in all cases so to choose the molecular proportions of the components that at least one methylol group etherified with a lower alcohol or at least one free methylol group is present in the end product.

In general the new products are wax-like bodies and are insoluble or slightly soluble in water and in many cases in lower alcohols, but dissolve well in solvents of pronounced organic character, such as esters, ketones, higher alcohols and especially hydrocarbons of aromatic or aliphatic character. They are compatible with fatty oils, which are soluble in solvents of pronounced organic character, and also with a large number of natural and artificial resins, such as colophony and derivatives thereof, colophony-phenol resins, soluble phenol resins, maleic acid esters, heat-treated copals, alkyd resins, styrolized oils, condensation resins soluble in organic solvents, for example, urea or aminotriazine resins, and also with soluble ketone resins and vinyl resins, resins containing epoxide groups and the like. The solubility or compatibility of the products is strongly influenced by the nature and number of groups of high molecular weight which have been introduced into the new products.

The products obtainable by the present process, provided that they have been prepared from suitable starting materials, can be used, inter alia, as assistants, for example, in the textile, leather and paper industries. They are especially suitable as agents for imparting a water-repellent effect to textiles made from cotton, regenerated cellulose, cellulose ester, wool, silk, polyamide fibers or polyacrylonitrile fibers or as ingredients of such agents. Accordingly, the invention also includes a process for producing a water-repellent dressing on textiles, wherein the textile is impregnated with a bath containing a condensation product obtained in accordance with the invention and if desired another substance capable of imparting a water-repellent effect and a hardening catalyst, and the condensation product is hardened. The invention further includes compositions suitable for producing a water-repellent dressing.

The impregnation may be carried out with the aid of an organic solvent or with an aqueous emulsion. When solutions are used it is desirable to use solvents of the kind used for dry cleaning, for example, carbon tetrachloride, trichlorethylene, benzine, ortho-dichlorobenzene, or a mixture of such solvents. As additional substances capable of imparting a water-repellent effect, which may also be used, if desired, there are suitable beeswax, carnauba wax, montan wax, synthetic waxes, for example, those obtained from aliphatic carboxylic acids of high molecular weight, such as stearic acid, behenic acid or montanic acid, and monohydric alcohols such as octadecyl alcohol, and paraffin wax is especially suitable. As hardening catalysts there come into consideration those which are soluble in organic solvents, for example, strong organic acids such as formic acid, acetic acid or chloracetic acid, or compounds which are capable of splitting off acid under the action of heat, such as tartaric acid diethyl ester or triacetin.

When aqueous emulsions are used for the impregnation it is of advantage to use the known water-soluble hardening catalysts, such as acids or ammonium salts of strong acids, for example, ammonium chloride. To the bath used for imparting a water-repellent effect there may be added water-soluble aluminum salts of organic or inorganic acids, such as formic acid, acetic acid or sulfuric acid, or zirconium compounds, e.g. zirconium salts or sols of hydrated zirconium dioxide. For preparing the aqueous emulsions various emulsifying agents may be used. Especially advantageous as emulsifying agents are water-soluble salts of hardenable basic ternary condensation products which are obtainable by reacting together in any order of succession.

(1) A methylol-compound of an aminotriazine or an ether of such compound with an alcohol of low molecular weight, (2) An aliphatic compound containing a carbon chain of at least 7 carbon atoms and a reactive hydrogen atom bound to a hetero-atom, and (3) A primary or secondary amine or a tertiary amine which contains a reactive hydrogen atom bound to an oxygen or sulfur atom or to another non-basic nitrogen atom. These products themselves produce a water-repellent effect. The manufacture of these products is described in U.S. Patent No. 2,783,231 (application Ser. No. 304,442, filed August 14, 1952). A ternary basic condensation product suitable for the present invention is the reaction product which is obtainable by condensing a highly methylated methylol melamine first with stearic acid and then with triethanolamine. In the form of its acetate it is very suitable as an emulsifying agent. The addition of a basic ternary condensation product is also very advantageous when an organic solvent is used, in this case it is not the emulsifying properties of the compound which are of primary importance but the water-repellent effect which is additionally produced.

An especially advantageous form of the impregnating process consists in using a bath which contains the three following components dissolved or emulsified therein:

(1) A condensation product obtained from reaction components ($a$) and ($b$), (2) Paraffin wax and (3) A basic ternary condensation product as defined in the preceding paragraph, and (4) A hardening catalyst. The relative proportions of the individual components may vary within wide limits. Advantageously there are used 10 parts of the condensation product (1), 10–60 parts of paraffin wax (2) and 20 parts of the basic condensation product (3).

When solutions in organic solvents are used as impregnating baths they may be prepared by dissolving the individual components in the solvent. Alternatively, there may be used as starting material a mixture which contains all the components (condensation product, paraffin wax and the ternary basic condensation product), in suitable relative proportions. The ternary basic condensation product may be present in these mixtures in the form of the free base or a water-soluble salt, for example, as the acetate. Furthermore, these mixtures may also contain diluents or solvents, for example, alcohols of low molecular weight, such as ethyl alcohol, isopropyl alcohol or the like. They may likewise contain chlorinated or non-chlorinated hydrocarbons, e.g. benzene, toluene, xylene, chlorbenzene or 1,2-dichlorethane. Such mixtures are suitable not only for preparing impregnating baths with organic solvents. Thus, they can also be used in order to prepare aqueous baths. For this purpose the mixture is emulsified in water with the addition of an acid, and the emulsion is diluted to the desired bath concentration.

Aqueous impregnating baths can also be prepared by diluting concentrated emulsions and adding a hardening catalyst. The concentrated emulsions are of the oil-in-water type and contain all the constituents except as the hardening catalyst. The impregnation is carried out with the usual apparatus by customary methods. The hardening takes place after drying of the textile material or after evaporating the solvent. It may be carried out, for example, at 120–150° C. for 5–15 minutes. When the hardening is carried out at a lower temperature the period required for hardening is correspondingly prolonged. The water-repellent dressing produced by the present process, if the products used are suitably selected, is resistant to washing at the boil, and exhibit a very good water drop repellent effect.

The following examples illustrate the invention, the parts being by weight unless otherwise stated, and the relationship of parts by weight to parts by volume being the same as that of the kilogram to the liter:

*Example 1*

81 parts of commercial stearic acid are heated to 140° C., while stirring, in a closed round flask. A total of 8.11 parts of sodium carbonate of 98 percent strength is added in small portions while simultaneously raising the temperature of the melt to 160–170° C. As soon as all the sodium carbonate has been consumed, which is recognisable by the cessation of the evolution of carbon dioxide, the stearic acid-sodium stearate melt is cautiously cooled to about 130° C. 14 parts of epichlorhydrin are then slowly introduced dropwise, and then the melt is gradually reheated to 150° C. When all the epichlorhydrin has been introduced, the mixture is stirred for a further 7 hours at 140–150° C.

By withdrawing a test portion from the well stirred melt and, after taking it up in ether and agitating it with dilute acid followed by washing with distilled water, determining the acid number, it is found to have an acid number of 1–3. The hydroxyl number is 96.5 instead of 94.5 calculated for a diglyceride of commercial stearic acid having a molecular weight of 270.

Into the melt of the above described stearic acid diglyceride cooled to 120° C. are introduced 67.6 parts of the ester obtained from highly methylated methylol-melamine and stearic acid as described below. Under a good vacuum produced by a water jet pump the contents of the flask, which are now boiling vigorously, are heated first for 2 hours at 120° C., then in the course of 1 hour up to 160° C. and for 2 hours at 200° C.

After pouring the reaction mass on to a metal plate there is obtained a very hard and brittle product melting at 41–42° C.

The ester obtained from the highly methylated methylol-melamine and stearic acid is prepared in a manner analogous to that of the esters described in British Patent No. 611,012.

In order to prepare the methylol-melamine methyl ether 324 parts (1 mol) of finely pulverized hexamethylol-melamine are introduced, while stirring, at room temperature into 2000 parts by volume of methyl alcohol which contains 100 parts by volume of concentrated hydrochloric acid. After 10 minutes the methylol-compound is dissolved. The solution is immediately stirred with about 160 parts of calcined sodium carbonate until it is neutral to litmus. The precipitated salt is filtered off, and the solution is evaporated under reduced pressure to a syrup. The syrup concentrated to about 99 percent is then filtered while hot in order to remove the residual salt.

1 part of this methylol-melamine methyl ether is heated with 1.3 parts of stearic acid under a pressure of 10–20 mm. at 180–200° C. until the acid number of the product has fallen to 5–8.

*Example 2*

By the procedure described in Example 1, 69 parts of a condensation product obtained from methylated methylol-melamine and N-methylol-stearic acid amide are introduced into 98 parts of the molten ester obtained from 1 mol of glycerine and 2 mols of commercial stearic acid. The new condensation product so obtained is a hard wax-like mass which is soluble, for example, in molten paraffin wax.

The aforesaid condensation product is prepared by heating a mixture of 66 parts of N-methylol-stearic acid amide and 39 parts of the methylol-melamine methyl ether mentioned in Example 1 at 115–120° C. for 1–2 hours under a pressure of 10–20 mm. A hard brittle mass is obtained.

*Example 3*

In a manner analogous to that described in Example 1, 77 parts of a condensation product obtained from methylated methyol-melamine and N-methlol-octadecyl carbamic acid ester are introduced into 98 parts of the molten ester obtained from 1 mol of glycerine and 2 mols of commercial stearic acid. There is obtained a product having properties similar to those of the product of Example 2. The new condensation product so obtained is a hard wax-like mass which is soluble, for example, in molten paraffin wax.

The aforesaid condensation product is prepared by heating a mixture of 68 parts of N-methylol-octadecyl-urethane, obtained from octadecyl-urethane and formaldehyde by a known method, and 39 parts of the methylol-melamine methyl ether described in Example 1 at 115–120° C. for 2 hours under a pressure of 10–20 mm. A brittle wax-like mass is obtained.

*Example 4*

270 parts of commercial octadecyl alcohol are melted, while stirring, and mixed with a solution of 11.5 parts of sodium in 140 parts by volume of methanol. By introducing nitrogen while slowly heating the reaction product to 160° C. the methanol is driven off. 46 parts of epichlorhydrin are introduced into the melt cooled to 95–100° C., and sodium chloride precipitates immediately. The contents of the flask are then heated slowly to 150° C. and subsequently stirred for a few hours.

After cooling, there is obtained a hard fatty mass which is rather sparingly soluble in alcohol. It consists essentially of a diether of glycerine.

65 parts of this glycerine diether are melted with 45 parts of an ester obtained from highly methylated methylol-melamine and stearic acid as described in Example 1, and the mixture is heated in the course of 4 hours, while stirring, under a pressure of 10–20 mm. to 200° C.

The reaction product solidifies to a hard wax-like mass which is rather sparingly soluble, for example, in molten paraffin wax.

Instead of the ester of highly methylated methylol melamine and stearic acid, there may be used a condensation product obtained from 1 mol of methylol-melamine methyl ether and 2 mols of commercial stearyl alcohol.

*Example 5*

19 parts of the highly methylated methylol melamine described in Example 1 are melted in a reaction vessel with 60 parts of a glycerine distearic acid ester, and the mixture is heated under 15 mm. pressure in the course of 3½ hours to 200–210° C. The new condensation product so obtained is a hard wax-like mass which is soluble, for example, in molten paraffin wax.

Analogous wax-like products, which are brittle at room temperature, are obtained by working in the manner described above but with the use of 60 parts of a glycerine dioctadecyl ether, instead of 60 parts of the aforesaid glycerine distearic acid ester, or by using 90 parts of the aforesaid glycerine diester.

*Example 6*

In the last paragraph of Example 1 is described the preparation of a methylol-melamine methyl ether distearate. The corresponding monostearic acid ester may be prepared as follows: 100 parts of the highly etherified methylol-melamine methyl ether described in Example 1 are heated with 65 parts of commercial stearic acid under a pressure of 10–15 mm. at 180–200° C. until the acid number of the product has fallen to 1–3.

62 parts of the methylol-melamine methyl ether monostearate so obtained are heated with 131 parts of glycerine distearic acid ester in the course of 3–4 hours from 100° C. to 200° C. under a vacuum produced by a water jet pump. The new condensation product so obtained is a hard wax-like mass which is soluble, for example, in molten paraffin wax.

Another wax-like reaction product having similar properties is obtained by condensing one mol of glycerine dioctadecyl ether with one mol of the above monostearate. Furthermore, analogous condensation products having similar properties are obtained by reetherifying one mol of highly methylated methylol-melamine with one mol of commercial stearyl alcohol, and then the condensation product so obtained is reacted with 2 mols of glycerine distearic acid ester or 2 mols of glycerine dioctadecyl ether.

*Example 7*

Cotton gabardine is treated on a foulard to give an increase in weight of about 100 percent in an aqueous bath having a temperature of 60–65° C., which contains 8.8 parts of water, 0.1 part of ammonium chloride and 1.1 part of the emulsion described below. The fabric is then dried at 80° C. and then after-treated for 5–15 minutes at 120–150° C. The unwashed, as well as the washed, fabric possesses good water-repellent properties.

Instead of cotton gabardine there may be used for example a fabric of regenerated cellulose, a fabric of a cellulose ester, a fabric of polyamide fibers or paper.

The emulsion used is prepared as follows:

20 parts of the salt of the ternary basic condensation product described below are melted at about 90° C. with 10 parts of paraffin wax, 10 parts of the product obtained as described in the third paragraph of Example 1 and 1 part of glacial acetic acid. 70 parts of water at 70° C. are then run in, while stirring strongly. The emulsion so obtained is subsequently stirred until it reaches room temperature. However, it may be used in the warm state.

Emulsions having similar properties are made by using, instead of the product of Example 1, 10 parts of any one of the reaction products prepared as described in Examples 2–6.

The aforesaid salt of the basic ternary condensation product is prepared as follows:

A mixture of 15 parts of triethanolamine and 90 parts of a molten ester of methylated methylolmelamine and stearic acid, the preparation of which is described in the last paragraph of Example 1, is heated, while stirring, under reduced pressure (10–20 mm.) at 115–120° C. until a test portion withdrawn from the reaction vessel is soluble in dilute warm acetic acid. This is generally the case after 1–2 hours. The melt is then stirred at 70–80° C. with 7 parts of glacial acetic acid. There is obtained a yellowish wax-like mass which is soluble in dilute acetic acid.

*Example 8*

Cotton gabardine is treated on a foulard at 60–65° C. with the liquor described below, and then the fabric is squeezed until its increase in weight is 100 percent. The liquor used is prepared as follows:

20 parts of the salt of the ternary basic condensation product described at the end of Example 7 are melted at 70° C. while stirring with 10 parts of paraffin wax and with 10 parts of any one of the products obtainable as described in the third paragraph of Example 1 and in Examples 2–6.

There are then added 5 parts of isopropyl alcohol and 4 parts of glacial acetic acid and the mixture is heated while stirring, up to 90° C. at which temperature 90 parts of water at 60–70° C. are added. There is obtained immediately an emulsion which after being subsequently stirred for a short time is poured into 860 parts of water at 70° C. which contains 10 parts of ammonium chloride.

The material treated with the above liquor is then dried at 70–90° C. and then heated for 5–15 minutes at 120–150° C. The washed, and also the unwashed, fabric possesses good water-repellent properties.

*Example 9*

Cotton gabardine is treated on a foulard at 20–30° C. with a solution of carbon tetrachloride which contains in 1000 parts of solution 20 parts of the ternary basic condensation product described at the end of Example 7, 10–60 parts of paraffin wax and 10 parts of any one of the products obtained as described in the third paragraph of Example 1 and Examples 2–6, and also 50 parts of a solution of 10 percent strength of monochloracetic acid in ethanol.

The solvent is then allowed to evaporate in the air and the fabric is heated for 5 minutes at 145° C. In this manner there is obtained a water-repellent dressing which is resistant to washing at the boil.

*Example 10*

Cotton gabardine is treated on a foulard at 20–30° C. with a carbon tetrachloride solution containing, per 1000 parts of the solution, 10–5 parts of any one of the products obtainable according to the third paragraph of Example 1 or according to Examples 2–6, and also 10–60 parts of paraffin in addition to 50 parts of a 10 percent solution of monochloracetic acid in ethanol. Instead of carbon tetrachloride, the solvent may be trichlorethylene, perchlorethylene, benzine or another high boiling petroleum hydrocarbon.

The solvent is then allowed to evaporate in the air and the fabric heated to 120–145° C. for 5–10 minutes. In this manner a water-repellent dressing is produced which is fast to washing at the boil. The cotton fabric now has a full, solid handle.

When this treatment is applied to a wool fabric a good filing effect is produced.

The water-repellent effect and the full handle is imparted to cotton, and the filing effect to wool, even if no catalyst is used.

*Example 11*

A nylon fabric is treated on a foulard at 50–55° C. with a liquor prepared as follows:

At 70° C. 22 parts of the ternary basic condensation product described at the end of Example 7 are melted while stirring with 11 parts of paraffin and 11 parts of any one of the products obtainable according to the third paragraph of Example 1, or according to Examples 2–6.

There are then added to the melt 8.5 parts of chlorobenzene and 5 parts of glacial acetic acid and the whole is heated to 80–90° C. while stirring. At that temperature 105 parts of water of 60–70° C. are added. An emulsion is obtained immediately. It is stirred for a short while before it is poured into 835 parts of water of 50° C. containing 2.5 parts of crystalline aluminum sulfate.

After treatment with the above liquor, the fabric is dried at 80° C. and then heated to 120–150° C. for 5 minutes. Before and after washing in a bath containing 5 grams of soap per liter and 2 grams of sodium carbonate per liter and having a temperature of 50° C. the nylon fabric has a soft feel and a very good water repellency.

Instead of a nylon fabric there can be used a fabric made from some other polyamide fibers or polyacrylic nitrile fibers or a fabric made from cotton, regenerated cellulose, cellulose ester or wool, or mixed fabrics made from these materials.

What is claimed is:

1. A composition of matter suitable for producing water-repellent dressings on textiles, which comprises (A) a hardenable water-insoluble derivative of a formaldehyde condensation product of an amino-1:3:5-triazine containing at least two $NH_2$-groups and which derivative has been obtained by condensing with the aid of heat and under substantially anhydrous conditions (a) a formaldehyde condensation product of an amino-1:3:5-triazine, said condensation product containing 2 to 3 hydroxymethylated $NH_2$-groups, and in which condensation product at least one N-hydroxymethyl group for every hydroxymethylated $NH_2$-group of the aminotriazine is etherified with a saturated monohydric alcohol containing at most 4 carbon atoms, and in which condensation product further at least one N-hydroxymethyl group is condensed with a member selected from the group consisting of aliphatic saturated monocarboxylic acids containing 8 to 18 carbon atoms, aliphatic saturated monohydric alcohols containing 8 to 18 carbon atoms, N-methylolamides of aliphatic saturated monocarboxylic acids containing 8 to 18 carbon atoms and N-methylol urethanes of aliphatic saturated monohydric alcohols containing 8 to 18 carbon atoms, with (b) a member selected from the group consisting of partial esters of an aliphatic saturated polyhydric alcohol with an aliphatic saturated monocarboxylic acid containing 12 to 18 carbon atoms and partial ethers of an aliphatic saturated polyhydric alcohol with an aliphatic saturated monohydric alcohol containing at least 12 carbon atoms, and (B) a water-repellent wax.

2. A composition of matter suitable for producing water-repellent dressings on textiles, which comprises (A) a hardenable water-insoluble derivative of a methylol-melamine which has been obtained by condensing with the aid of heat and under substantially anhydrous conditions (a) a methylolmelamine methylether in which at least one N-hydroxymethyl group is condensed with a member selected from the group consisting of aliphatic saturated monocarboxylic acids containing 8 to 18 carbon atoms, aliphatic saturated monohydric alcohols containing 8 to 18 carbon atoms, N-methylolamides of aliphatic saturated monocarboxylic acids containing 8 to 18 carmon atoms and N-methyl urethanes of aliphatic saturated monohydric alcohols containing 8 to 18 carbon atoms, with (b) a member selected from the group consisting of partial esters of an aliphatic saturated polyhydric alcohol with an aliphatic saturated monocarboxylic acid containing 12 to 18 carbon atoms and partial ethers of an aliphatic saturated polyhydric alcohol with an aliphatic saturated monohydric alcohol containing 12 to 18 carbon atoms, (B) paraffin wax and (C) water-soluble salt of a ternary basic condensation product obtained by heating together a methylol melamine methyl ether, stearic acid and triethanolamine.

3. Textile material which is rendered water-repellent by impregnating it with a composition of matter, which comprises (A) a hardenable water-insoluble derivative of a formaldehyde condensation product of an amino-1:3:5-triazine containing at least two $NH_2$-groups and which derivative has been obtained by condensing with the aid of heat and under substantially anhydrous conditions (a) a formaldehyde condensation product of an amino-1:3:5-triazine, said condensation product containing 2 to 3 hydroxy-methylated $NH_2$-groups, and in which condensation product at least one N-hydroxymethyl group for every hydroxymethylated $NH_2$-group of the aminotriazine is etherified with a saturated monohydric alcohol containing at most 4 carbon atoms, and in which condensation product further at least one N-hydroxymethyl group is condensed with a member selected from the group consisting of aliphatic saturated monocarboxylic acids containing 8 to 18 carbon atoms, aliphatic saturated monohydric alcohols containing 8 to 18 carbon atoms, N-methylolamides of aliphatic saturated monocarboxylic acids containing 8 to 18 carbon atoms and N-methylol urethanes of aliphatic saturated monohydric alcohols containing 8 to 18 carbon atoms, with (b) a member selected from the group consisting of partial esters of an aliphatic saturated polyhydric alcohol with an aliphatic saturated monocarboxylic acid containing 12 to 18 carbon atoms and partial ethers of an aliphatic saturated polyhydric alcohol with an aliphatic saturated monohydric alcohol containing 12 to 18 carbon atoms, and (B) a water-repellent wax.

4. Textile material which is rendered water-repellent by impregnating it with a composition of matter, which comprises (A) a hardenable water-insoluble derivative of a methylolamine which has been obtained by condensing with the aid of heat and under substantially anhydrous conditions (a) a methylolmelamine methylether in which at least one N-hydroxymethyl group is condensed with a member selected from the group consisting of aliphatic saturated monocarboxylic acids containing 8 to 18 carbon atoms, aliphatic saturated monohydric alcohols containing 8 to 18 carbon atoms, N-methylolamides of aliphatic saturated monocarboxylic acids containing 8 to 18 carbon atoms and N-methylol urethanes of aliphatic saturated monohydric alcohols containing 8 to 18 carbon atoms, with (b) a member selected from the group consisting of partial esters of an aliphatic saturated polyhydric alcohol with an aliphatic saturated monocarboxylic acid containing 12 to 18 carbon atoms and partial ethers of an aliphatic saturated polyhydric alcohol with an aliphatic saturated monohydric alcohol containing 12 to 18 carbon atoms, (B) paraffin wax and (C) a water-soluble salt of a ternary basic condensation product obtained by heating together a methylol melamine methyl ether, stearic acid and triethanolamine.

5. A composition of matter suitable for producing water-repellent dressings on textiles, which comprises (A) 10 parts of a hardenable water-insoluble derivative of a methylolmelamine which has been obtained by condensing with the aid of heat and under substantially anhydrous conditions 1 mol of (a) A highly etherified methylolmelamine methyl ether which is esterified with 2 mols of stearic acid with 2 mols of (b) Stearic acid diglyceride, (B) 10 parts of paraffin wax, (C) at least 18 parts of a ternary basic condensation product obtained by heating together methylol melamine methyl ether, stearic acid and triethanolamine and 4–14 parts of chlorobenzene.

6. A composition of matter suitable for producing water-repellent dressings on textiles, which comprises a concentrated aqueous emulsion of (A) 10 parts of a hardenable water-insoluble derivative of a methylolmelamine which has been obtained by condensing with the aid of heat and under substantially anhydrous conditions 1 mol of (a) A methylolmelamine methyl ether which is esterified with 2 mols of stearic acid with 2 mols of (b) Stearic acid diglyceride, (B) 10 parts of paraffin wax, and (C) at least 18 parts of the acetate of a ternary basic condensation product obtained by heating together methylol melamine methyl ether, stearic acid and triethanolamine.

References Cited in the file of this patent

UNITED STATES PATENTS

| 2,491,249 | Cathers et al. | Dec. 13, 1949 |
| 2,498,454 | Schibler | Feb. 21, 1950 |
| 2,783,231 | Albrecht et al. | Feb. 26, 1957 |
| 2,794,008 | Ginsler | May 28, 1957 |

FOREIGN PATENTS

| 611,012 | Great Britain | Oct. 25, 1948 |
| 665,473 | Great Britain | Jan. 23, 1952 |
| 562,089 | Great Britain | June 19, 1944 |

OTHER REFERENCES

Payne: Organic Coating Technology, vol. 1, pages 48–9, 52–5, John Wiley.

The Condensed Chemical Dictionary, 5th ed., p. 1030, Reinhold, 1956.